Feb. 16, 1971   J. R. PARKS ETAL   3,563,634
SYSTEM AND APPARATUS FOR IMPROVING THE CONTRAST OF
OR FOR THE BINARISING OF ANALOGUE DENSITY PATTERNS
Filed Dec. 14, 1967   5 Sheets-Sheet 1

Feb. 16, 1971   J. R. PARKS ETAL   3,563,634
SYSTEM AND APPARATUS FOR IMPROVING THE CONTRAST OF
OR FOR THE BINARISING OF ANALOGUE DENSITY PATTERNS
Filed Dec. 14, 1967   5 Sheets-Sheet 2
*Fig.4.*
(a) 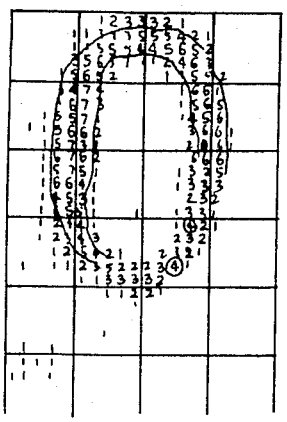  (b) 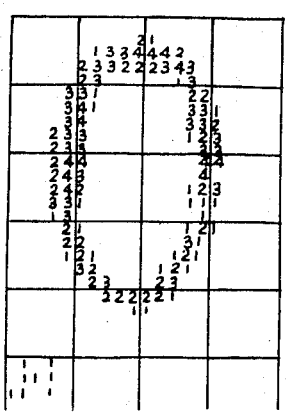  (c) 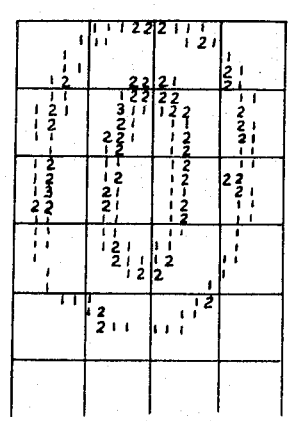
*Fig.5.*
(a) 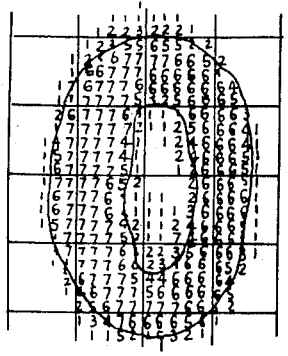  (b) 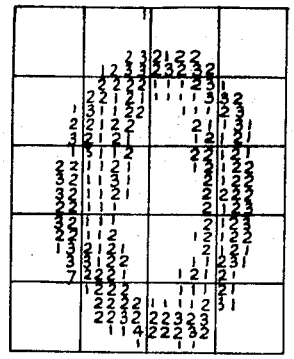  (c) 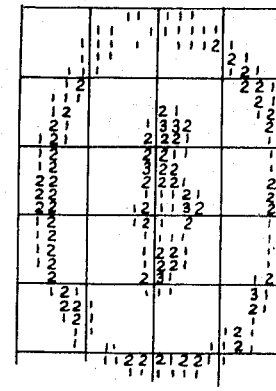
*Fig.6.*
(a) 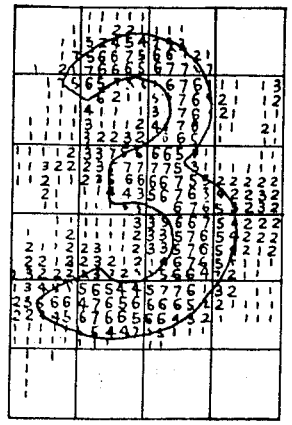  (b) 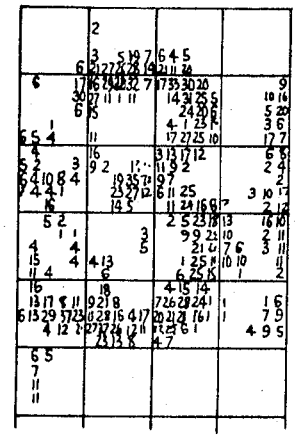  (c) 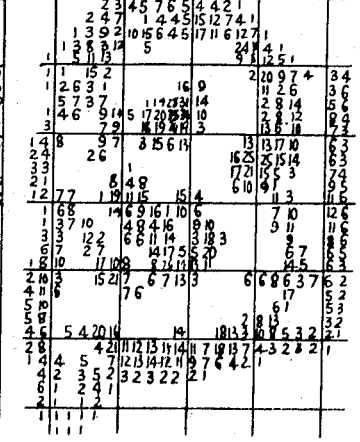

Fig. 7.
(a) 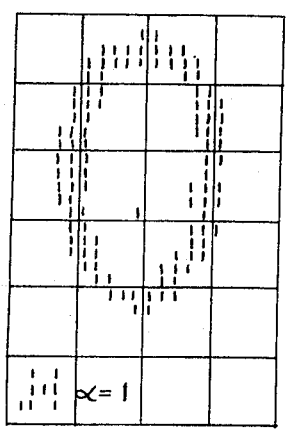   (b) 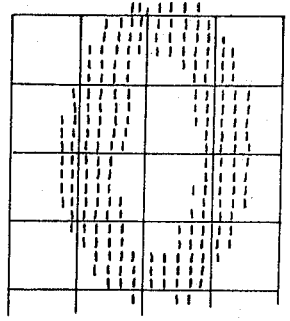
Fig. 8.
(a) 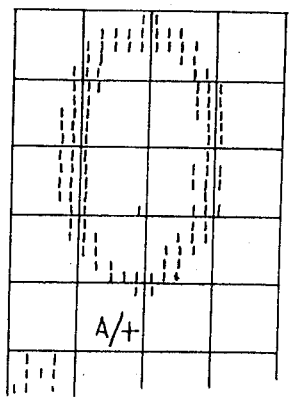   (b) 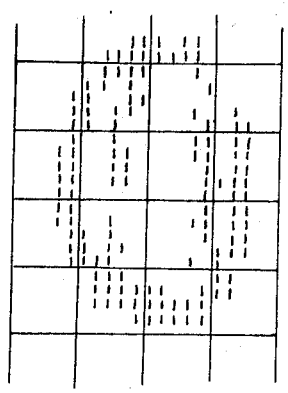

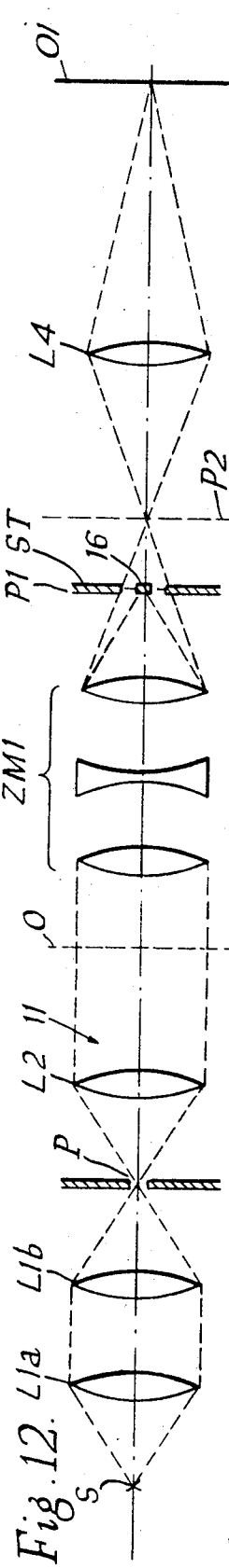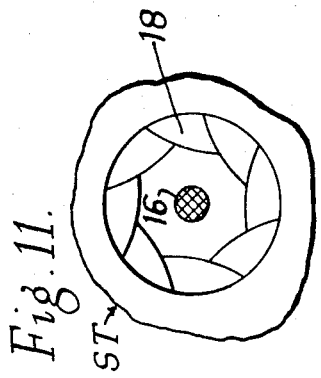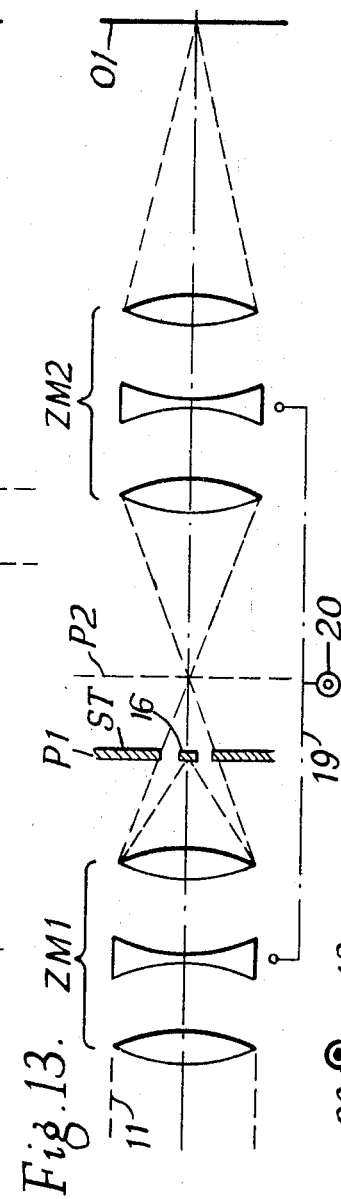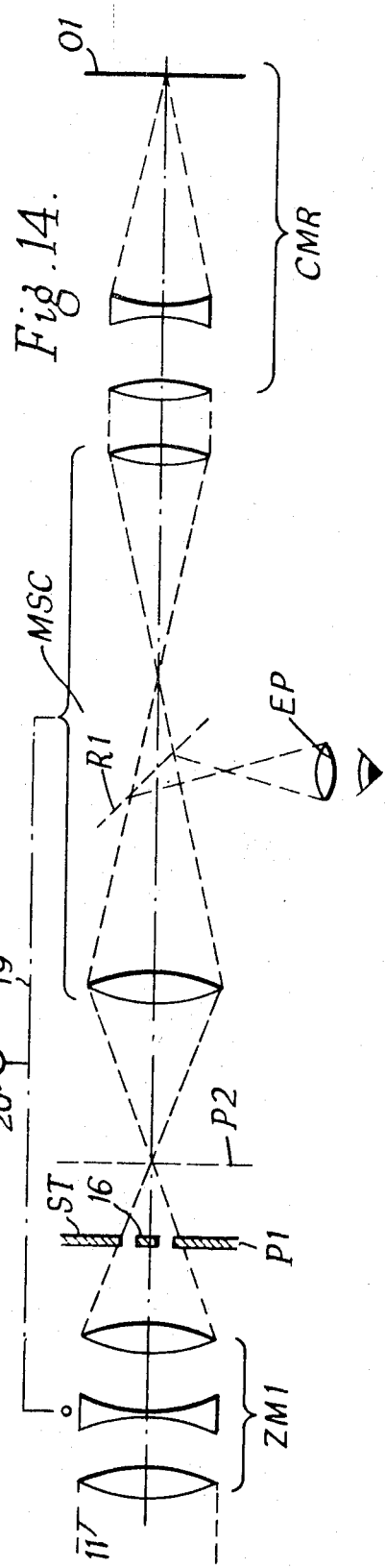

3,563,634
SYSTEM AND APPARATUS FOR IMPROVING THE CONTRAST OF OR FOR THE BINARISING OF ANALOGUE DENSITY PATTERNS
John Ronald Parks and Ralph Eric Rengger, Teddington, England, assignors to National Research Development Corporation, London, England, a British corporation
Continuation-in-part of application Ser. No. 579,268, Sept. 14, 1966. This application Dec. 14, 1967, Ser. No. 690,551
Claims priority, application Great Britain, Sept. 15, 1965, 39,435/65
Int. Cl. G02b 27/38
U.S. Cl. 350—162                                    26 Claims

ABSTRACT OF THE DISCLOSURE

Optical arrangements for isolating chosen spatial frequency components of an analogue form density or intensity object pattern, e.g. a printed character, in which a transparency of the object pattern is disposed in a collimated light beam and by means of an optical system a diffraction pattern is produced in or beyond the Fourier plane, said Fourier plane containing a light stop having an annular pass aperture and the light passing said stop being imaged in a resultant image plane.

---

This application is a continuation-in-part of our earlier U.S.A. patent application, Ser. No. 579,268 filed Sept. 14, 1966, now abandoned, for "A System and Apparatus for Improving the Contrast of or for the Binarising of Analogue Density Patterns, such as printed characters."

This invention relates to a spatial frequency filter system and apparatus which is particularly, although not exclusively, suitable for improving the contrast of, or for converting to a binary or two-state form, an analogue density pattern such as a printed or written character. The invention has particular application to the recognition or classification of printed, written or otherwise produced characters such as alphabetical or numerical symbols or other patterns such as fingerprints, aerial photographs, blood smears or chromosomes.

It is already well known that the retinae of many animals contain mechanisms of a form in which the activity of a single fibre is increased when an exploratory light spot falls within a restricted circular area coincident with the fibre. Any stimulation of an annular area surrounding such restricted central area has the effect of reducing the spontaneous activity of the said single fibre. Such a mechanism may be regarded as a "concentric operator."

Broadly, the present invention resides in the provision of an approximate equivalent of such a concentric operator in the form of a n-tuple consisting of a central area surrounded by a ring of further areas and then mapping the character or pattern as the difference $\Delta$ between the central area density or intensity value and the mean of the density or intensity values of the surrounding further areas thereby to perform an approximate two dimensional double differentiation with the differential increment defined by the diameter of the annular ring surrounding the centre area. By suitable choice of the effective dimensions of such central area and the surrounding ring a filter capable of passing only certain spatial frequencies may be constructed.

One form of apparatus according to the invention and particularly adapted for use with character or pattern recognition systems comprises a modified Schlieren optical system in which the character or pattern to be processed is located in a collimated beam of monochromatic light and, by means of a suitable optical system, there is produced a diffraction pattern in the Fourier plane at which plane there is disposed a suitable light stop having an annular shaped light pass area which is variable continuously in size to provide spatial filtering over a wide frequency band whereby in the object plane a processed form of the original pattern is produced. Such processed form may be imaged on the light sensitive photocathode of a TV camera tube or the like for examination by a scanning process as described in U.S. Pats. 3,335,284 and 3,471,831.

In order that the nature of this invention may be more readily understood a number of examples of the use thereof and a number of apparatus arrangements in accordance with the invention will now be described by way of illustrative example only and with reference to the accompanying drawings in which.

Figure 3:
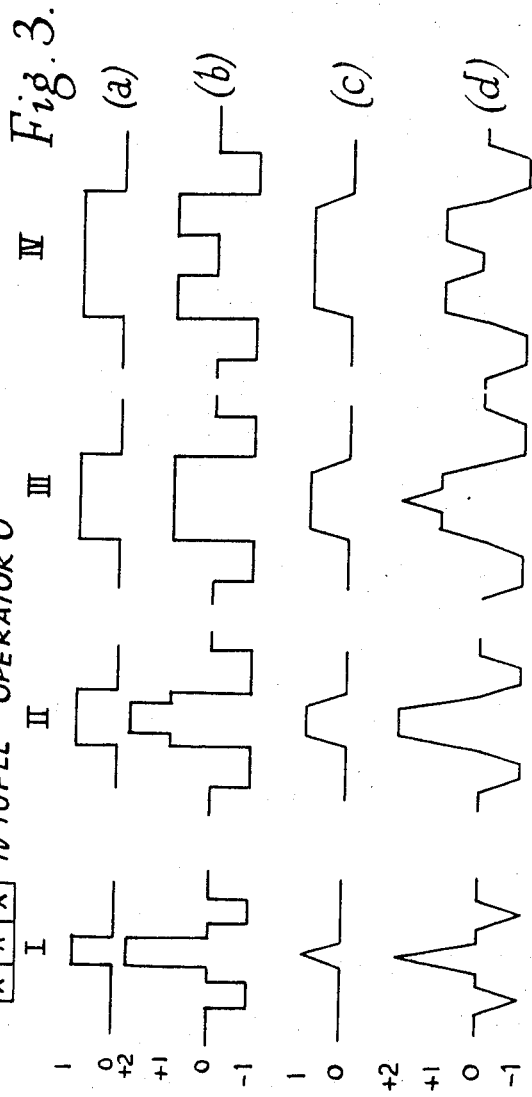
Figure 9:
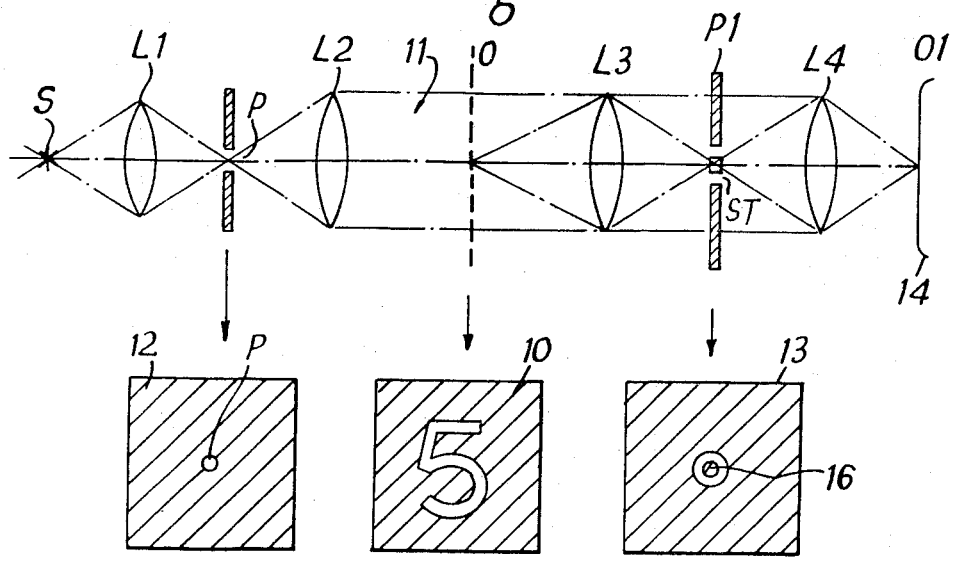
Figure 10:
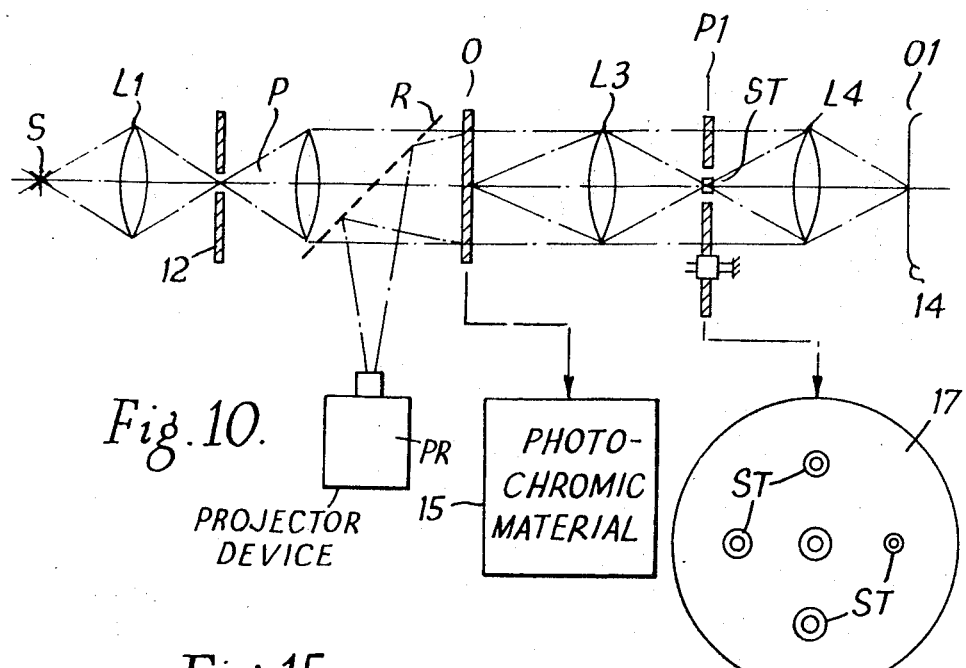
Figure 15:
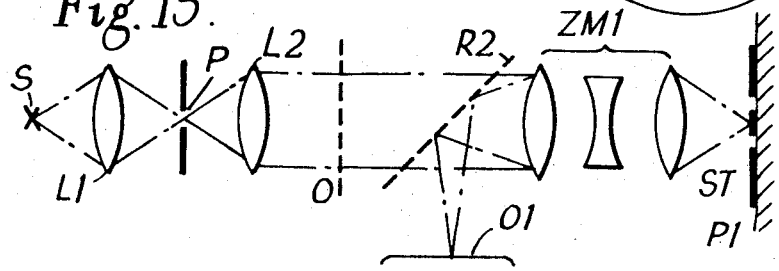

FIG. 3 comprises a series of explanatory diagrams (a), (b), (c) and (d);

FIGS. 4, 5, 6, 7 and 8 comprise a number of representations illustrating the application of the invention to different character examples;

FIG. 9 is a schematic diagram showing one apparatus arrangement;

FIG. 10 is a schematic diagram similar to that of FIG. 9 illustrating a modified apparatus arrangement;

FIG. 11 is an elevational view of a modified form of optical light stop;

FIG. 12 is a schematic diagram, similar to FIGS. 9 and 10, illustrating a further modified apparatus arrangement in accordance with the invention which permits variation of the spatial frequency of filtering;

FIG. 13 is a fragmentary schematic diagram illustrating a first modification of the arrangement of FIG. 12;

FIG. 14 is another fragmentary schematic diagram illustrating a second modification of the arrangement of FIG. 12, while FIG. 15 is a further schematic diagram illustrating yet another modified apparatus arrangement according to the invention.

Figure 1:
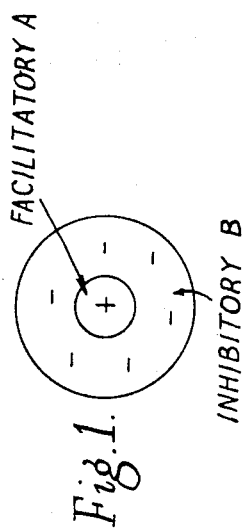
FIG. 1 is a diagram showing the basic form of the concentric operator of which an approximate equivalent is employed in this invention.

Referring to the drawings, FIG. 1 indicates diagrammatically the basic form of the "concentric operator" as found in many animals and in which the central area A is the stimulated zone and the surrounding annulus B is the inhibitory zone, any simultaneous stimulation of which reduces the spontaneous activity of the central area.

Figure 2:
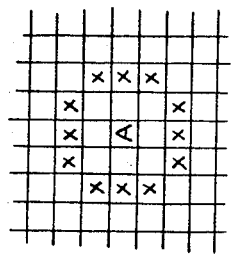
FIG. 2 is a representation of one form of n-tuple as employed in this invention as an equivalent of the concentric operator of FIG. 1.

FIG. 2 illustrates a substantially equivalent n-tuple for examining an input pattern and by means of which a difference output $\Delta$ can be obtained where $\Delta$ is the difference between the density or intensity of the central point A and the mean of the densities or intensities of the $(n-1)$ surrounding points $x$ whereby an approximate two-dimensional double differentiation is effected with the differential increment defined by the diameter of the ring of points $x$.

In the use of such as n-tuple equivalent of a concentric operator, the diameter of the ring $x$ determined whether a narrow pattern will be resolved at a single line or as a pair of edges. Referring next to FIG. 3 this illustrates in diagram row (b) the relative values of the differential $\Delta$ as an n-tuple or operator of the form indicated at O is moved along a rectilinear path across a variety of a number of pattern areas of different widths as indicated in diagram (a) in columns I, II, III and IV respectively and in which the vertical ordinate defines the density (or intensity) value of the pattern at different positions along such path. In this FIG. 3, the example has been reduced to one dimensional form for convenience of illustration. Diagrams (c) and (d) correspond to those of (a) and (b) for the case where the pattern density (or intensity) has edges of progressively changing instead of abruptly changing character as in diagram (a). Considering diagrams (a) and (b) by way of example, scanning movement of the operator equivalent O from left to right over the first illustrated character width of column I results in zero output Δ while the operator equivalent is positioned wholly over the background area of constant density (or intensity) regardless of whether such area is, for example, black or white. Movement of the operator equivalent O to a region where an area of changed density (or intensity) is located only within part of the outer annulus of points $x$ results in an overriding effectiveness of such outer inhibitory area to produce an output of one sense. Further movement of the operator equivalent O to the position where the density (or intensity) pattern is centred wholly within the central area A causes a maximum output in the opposite sense. Continued movement of the operator equivalent results in the development of an output in the original sense when the pattern is coincident with a part of the outer annulus of points $x$ whereas when the operator equivalent has moved to coincide once again wholly with the constant density or intensity background zone, the output returns to zero.

When the diameter of the operator equivalent O is less than the width of a pattern area of constant density or intensity being examined, the output Δ will return to zero value whilst such operator equivalent is coincident with the pattern area as shown in the last group (column IV) of the four pattern widths of diagram (a) and (b) leading to the production of two separate responses, one for each edge of the pattern area. Such double or "outline" form is in contrast to the single or "inline" form which is provided when the operator diameter is of the same order as or greater than the pattern width as illustrated in column I of the diagrams. Identification and separation of the responses is readily possible by reason of the characteristic changes of sign.

FIGS. 4, 5 and 6 illustrate the application of such operator technique to a number of characters shown at (a) in each figure which are of poorly printed or mutilated form; the representations shown at (b) in the respective figures relate to the use of an operator whose diameter is such that it produces an "inline" form of response whereas the representations shown at (c) in the figures relate to the use of an operator whose diameter is such that the "outline" form of response is produced. In each of these character representations the small numerals therein indicate the relative density of the pattern. As will be seen, the use of the operator in each of the three examples has the effect of making the character more readily identifiable as to its intended shape.

In addition to improvement of the contrast of a pattern by the use of an operator as discussed above, use thereof may also be made for effecting conversion of the analogue density form of the character to a binary or two-state form by application of a suitable threshold value to the variable output Δ obtained from use of the operator. Thus, if the threshold value be denoted by $\alpha$ the rule for transposing each point A in FIG. 2 is as follows:

Set $\Delta = 1$ if $A > \frac{1}{(n-1)} \Sigma$ (points $x$) $- \alpha$

Set $\Delta = 0$ if $A < (n-1) \Sigma$ (points $x$) $- \alpha$

Such threshold value $\alpha$ may be either a constant selected to remove small differentials as illustrated in the examples given in FIG. 7 in which diagram (a) illustrates the result obtained by application of a threshold value $\alpha = 1$ to the representation (b) of FIG. 4. Diagram (b) of FIG. 7 illustrates the result of the similar application of a threshold value $\alpha = 1$ to the representation (b) of FIG. 5.

Alternatively such threshold value $\alpha$ may be made a function of A by setting $\alpha = A/K$ when the binary-converted pattern reflects the existance of contrast differential exceeding the stated proportion of the character density as shown in the examples given in FIG. 8 in which diagram (a) illustrates the result obtained by application of a variable threshold value $\alpha = A/4$ to the representation (b) of FIG. 4 and diagram (b) illustrates the result obtained by application of the same variable threshold value to the representation (b) of FIG. 5.

To carry out the invention use may be made of arrangements by which a diffraction pattern of the examined pattern area, such as a character, is set up with an appropriate form of filtering stop to determine the effective size and form of the operator. One such arrangement is illustrated in FIG. 9 where a modified form of Schlieren optical system is employed. The object O requiring processing, for example a transparency of a character under recognition as shown in elevation at 10, is located in the collimated beam 11 from a monochromatic light source S, such as a mercury source or a laser, obtained through the lens system L1, L2 and a pinhole aperture P as shown in elevation at 12. By means of the lens system L4 a Fraunhoffer diffraction pattern is set up at the Fourier plane P1, in which plane there is located a suitable light stop ST having an annular shaped pass aperture of the form shown in elevation at 13 to provide spatial filtering which produces a processed form of the object O in the plane O1 by means of the further lens system L4. Such plane O1 may conveniently be occupied by a photographic plate or the photo-sensitive cathode area of either a TV camera tube or an electron-image storage tube as indicated at 14 and which forms part of a pattern of character recognition device as described in the aforesaid applications. By executing a suitable scanning examination, e.g. by a raster form scan, of the image produced at O1 on the photocathode 14, the necessary input signals to the recognition system may be obtained from an improved pattern image of the original character at O.

Such an arrangement as described above requires a photographic transparency for the character object 10 at O but this may be avoided in the manner shown in FIG. 10 by the use at the object plane O of a sheet of photochromic material as indicated in elevation at 15. Such photochromic material, which is already well known, has the character of altering its optical density in response to applied radiation. In order to effect the required change of optical desity an image of the character or pattern to be recognised is produced on this plate 15 immediately prior to the processing operation already described by means of a reflector R from a suitable projection system PR. If, as shown, the reflector R is located within the beam 11 it will, of course, need to be of the half-silvered type. In FIG. 10, parts corresponding to those already described with reference to FIG. 9 have been given corresponding reference characters.

The form of the stop ST located in the Fourier plane P1 may be made variable in order to permit adjustment of the effective diameter of the operator and hence of the spatial frequency band of the filter. In many practical applications, the central opaque zone 16 (see FIG. 9) alone of the stop plate ST need be physically altered in size since effective alteration of the outer diameter of the annular light pass area can be achieved by altering the size of the original input light spot defined by the aperture P.

For certain applications, such as classification or recognition of particular patterns, the use of a variety of different stops ST may be desirable. These may be arranged at intervals around a circular disc as shown at 17, FIG. 10, such disc being rotatable about a central axis parallel with the beam 11 so as to permit any one of the available stop zones thereof being brought into alignment with the optical axis of the system shown.

As an alternative to effecting alteration of the size of the original light spot defined by the aperture P in the arrangements so far described in order to isolate a particular range of spatial frequencies, the outer opaque element of the light stop ST may be made in the form of a variable iris diaphragm as illustrated at 18 in FIG. 11.

Further alternative arrangements will now be described which enable alteration of the range of spatial frequencies isolated by the filter, e.g. for edge enhancement, to be achieved without altering the actual size of the stop located in the Fourier plane. The principle of these further arrangements is that if a light stop having an annular pass area of fixed size is placed on the optical axis in the Fourier plane the actual dimensions of the Fourier transform can be varied by means of a zoom lens. This has an effect equivalent to that of a variable size light stop element in a fixed Fourier plane.

FIG. 12 illustrates one optical system employing a fixed diameter circular opaque zone 16 and a fixed diameter outer opaque zone in the filter stop ST. As in the previous embodiments of FIGS. 9 and 10, a collimated light beam 11, obtained from a light source S by way of lens system L1a, L1b, a pinhole aperture P and lens system L2, is directed through the object O being processed, for instance, a transparency of a character under recognition; by means of a zoom lens system ZM1, set for objects at infinity for its range of zoom. A Fraunhoffer diffraction pattern is set up in the plane P2 through the Fourier plane P1 which contains the pass filter constituted by the light stop ST. As the zoom lens ZM1 is varied, the Fourier plane remains in constant position, whereas the image plane P2 of the object transparency O alters in position over the zoom range. In consequence the pass aperture of the stop ST effectively varies in size. The transparency image in the plane P2 is focused by the further lens system L4 in the receptor plane O1. The position of such receptor plane must accordingly be altered with change of the zoom in order to keep the final image of the transparency in focus.

Possible modifications of such a system include variation of the position of the lens system L4 instead of the receptor plane O1 in order to maintain the final image in focus or the provision of a variable focusing cap in front of the receptor plane O1 or the use for the lens system L4 of a variable focusing system, such as another zoom lens system.

If desired the zoom control of the zoom lens ZM1 may be suitably linked mechanically to whatever means are adopted for maintaining the final image in focus in the receptor plane O1. By this means variable filtering may be carried out with only one control needing manipulation by a human operator in order to set the system for the desired range of spatial frequency isolation, e.g. for edge enhancement in character recognition.

FIG. 13 illustrates a modification of the system shown in FIG. 12 in which a second zoom lens ZM2 is provided in place of the lens system L4 to permit control, e.g. constancy, of the size of the final image in the receptor plane O1. Such zoom lens system ZM2 may also be used as a variable focusing device to maintain a constant position of the receptor plane O1. By suitable mechanical linkage, as indicated schematically at 19, of the respective manual controls of the two zoom lens systems variable filtering may be effected with only one manually operated control member 20.

In the further system shown in FIG. 14 a microscope MSC is used in place of the second zoom lens ZM2 of FIG. 13 and is arranged to change position as the plane P2 changes position so that the final image of the transparency remains in focus in a fixed receptor plane O1 which, in this example, includes a photographic plate in a camera CMR. The microscope eye-piece EP enables the human operator to judge the best zoom position for the particular filtering effect desired, e.g. edge enhancement.

The receptor plane O1 may be occupied by any display or recording system instead of a photographic plate and by means of different objectives in the microscope the image may be viewed or recorded under different magnifications. The most suitable microscope for this purpose would be one having a wide angle of view without significant aberration.

If a constant or a variable control of size of the image is required, a zoom microscope may be used. The preceding zoom lens system ZM1 may be mechanically linked, as by means 19, to the microscope position control 20 to allow operation using one only variable manual control. If a zoom microscope is employed the zoom system thereof may also be mechanically linked to the previous zoom lens system ZM1. If required for demonstration purposes the microscope may include more than one eye-piece or alternatively a projection microscope may be used.

For calibration of the degree of magnification a graticule may be used as in ordinary microscope practice.

FIG. 15 illustrates yet another optical arrangement which is of simplified character but which suffers some limitation in its practical application owing to the incidence of multiple unwanted reflections from the lenses due to, normally, unavoidable imperfections in the latter. In this further modified arrangement a collimated light beam 11, obtained as in previous examples, from a light source S by way of a first lens system L1, a pinhole aperture P and a second lens system L2, is directed through the object O being processed. By means of a zoom lens system ZM1, a Fraunhoffer diffraction pattern is set up at the Fourier plane P1 which is occupied by a total light reflecting surface such as a fully silvered mirror upon which is located the annular apertured light stop ST. The diffraction pattern image is thereby returned through the zoom lens system ZM1 and the processed object image finally formed in the object plane O1 by way of the half-silvered mirror R2 in the beam 11.

For very high precision work it is desirable, if not essential, to employ monochromatic light to avoid chromatic aberration or to use a system corrected for chromatic aberration. It may be desirable to immerse the transparencies and the photographic opaques in oil to avoid risk of phase modulation.

The above described systems form what is effectively a variable spatial frequency filter shown and described as applied to the particular purpose of edge enhancement in character recognition. Many pass filters can however be obtained using this system which therefore has wider application. For example, if it is desired to discriminate between two patterns which differ from one another in respect of the spatial frequency components which they contain, a variable spatial frequency filter as described above could be set to pass only the particular frequency components of one pattern in order to effect discrimination.

The adjustable light stop construction of FIG. 11 may, of course, be used in any of the described embodiments in place of a stop of fixed dimensions.

We claim:
1. Apparatus for isolating chosen spatial frequency components of an analogue form density or intensity object pattern, such as a written or printed character, which comprises a modified Schlieren optical system including a light source, a first optical system for producing a collimated beam of light from said light source, locating means for disposing a transparency of said object pattern in said collimated beam, a second optical system for receiving said object pattern in said collimated beam and for producing a diffraction pattern of said object pattern in an image plane coincident with or beyond the Fourier plane, said second optical system including a zoom lens, a light stop having an annular shaped pass area which is effectively variable continuously in size by said zoom lens in said Fourier plane and centered on the axis of said second optical system and a third optical system for imaging the light passing said light stop in a resultant image plane.

2. Apparatus as in claim 1 wherein said third optical system also includes a zoom lens.

3. Apparatus as in claim 1 wherein said third optical system includes a microscope device.

4. Apparatus for isolating chosen spatial frequency components of an analogue form density or intensity object pattern, such as a written or printed character, which comprises a modified Schlieren optical system including a light source, a first optical system for producing a collimated beam of light from said light source, locating means for disposing a transparency of said object pattern in said collimated beam, a second optical system for receiving said object pattern in said collimated beam and for producing a diffraction pattern of said object pattern in an image plane coincident with or beyond the Fourier plane, a light stop having an annular shaped pass area in said Fourier plane and centered on the axis of said second optical system and optical system means for receiving said diffraction pattern and imaging the light passing said light stop in a resultant image plane, including means for varying continuously the size of said annular shaped pass area.

5. Apparatus according to claim 4 in which said optical system means comprises a third optical system.

6. Apparatus according to claim 5 in which said second optical system is of fixed character and produces said diffraction pattern in the Fourier plane containing said light stop.

7. Apparatus according to claim 5 in which said second optical system comprises a zoom lens.

8. Apparatus according to claim 7 in which said third optical system is made adjustable in position to permit focusing of the resultant image in a fixed position resultant image plane.

9. Apparatus according to claim 7 in which said third optical system comprises a variable focusing system to permit focusing of the resultant image in a fixed position resultant image plane.

10. Apparatus according to claim 5 in which said third optical system comprises a zoom lens.

11. Apparatus according to claim 5 in which said third optical system comprises a microscope device.

12. Apparatus according to claim 4 in which said light stop comprises an opaque central element of fixed size and a surrounding opaque element in the form of an iris diaphragm to permit adjustment of the radial width of the annular pass aperture.

13. Apparatus according to claim 4 in which said first optical system for producing a collimated light beam comprises a light stop having a pinhole aperture.

14. Apparatus according to claim 4 in which said light source is a monochromatic source.

15. Apparatus according to claim 14 in which said monochromatic light source is a mercury lamp.

16. Apparatus according to claim 14 in which said monochromatic light source is a laser.

17. Apparatus according to claim 4 in which said object pattern locating means comprises a sheet of photochromic material and which includes means projecting an image of the pattern on to said sheet of photochromic material.

18. Apparatus according to claim 4 in which said optical system means is said second optical system and in which said light stop is disposed on a light reflecting surface in said Fourier plane.

19. Apparatus according to claim 18 which includes a part-silvered mirror in said light beam between said object locating means and said second optical system to direct light returned through said second optical system to said resultant image plane.

20. Apparatus according to claim 4 which includes a camera type electron tube having its light sensitive cathode surface disposed in said resultant image plane.

21. Apparatus for improving the contrast of an analogue form density or intensity pattern, such as a written or printed character, which comprises a modified Schlieren optical system including a monochromatic light source, a first optical system for producing a collimated beam of light from said light source, means for disposing a transparency of the character object in said collimated beam, a second optical system for receiving said pattern in said collimated beam and for producing a diffraction pattern of said character object in the Fourier plane, light stop having an annular shaped pass area in said Fourier plane and centered on the axis of said second optical system, means for varying continuously the size of said annular shaped pass area and a third optical system for imaging the light passing said light stop in a resultant image plane.

22. Apparatus according to claim 21 in which said first optical system for producing a collimated light beam comprises a light stop having a pinhole aperture.

23. Apparatus according to claim 21 which includes a sheet of photochromic material in said means for disposing the character object in said light beam and means for projecting an image of the character or pattern on to said sheet of photochromic material.

24. Apparatus according to claim 21 which includes a camera type electron tube having its light sensitive cathode surface disposed in said resultant image plane.

25. Apparatus according to claim 21 which includes a movable member carrying a plurality of annular shaped light stops of different physical dimensions, said member being movable to align any chosen one of said light stops with the axis of said second optical system.

26. Apparatus according to claim 21 in which said monochromatic light source is a mercury lamp.

References Cited

UNITED STATES PATENTS

| | | | |
|---|---|---|---|
| 3,134,297 | 5/1964 | Carlson et al. | 350—160(P) |
| 3,195,396 | 7/1965 | Horwitz et al. | 356—71 |
| 3,370,268 | 2/1968 | Dobrin et al. | 350—162(SF) |

JOHN K. CORBIN, Primary Examiner

U.S. Cl. X.R.

340—146.3; 350—17, 206; 356—71